(No Model.)
H. W. BROESQUIN.
VEHICLE HUB.
No. 516,471. Patented Mar. 13, 1894.
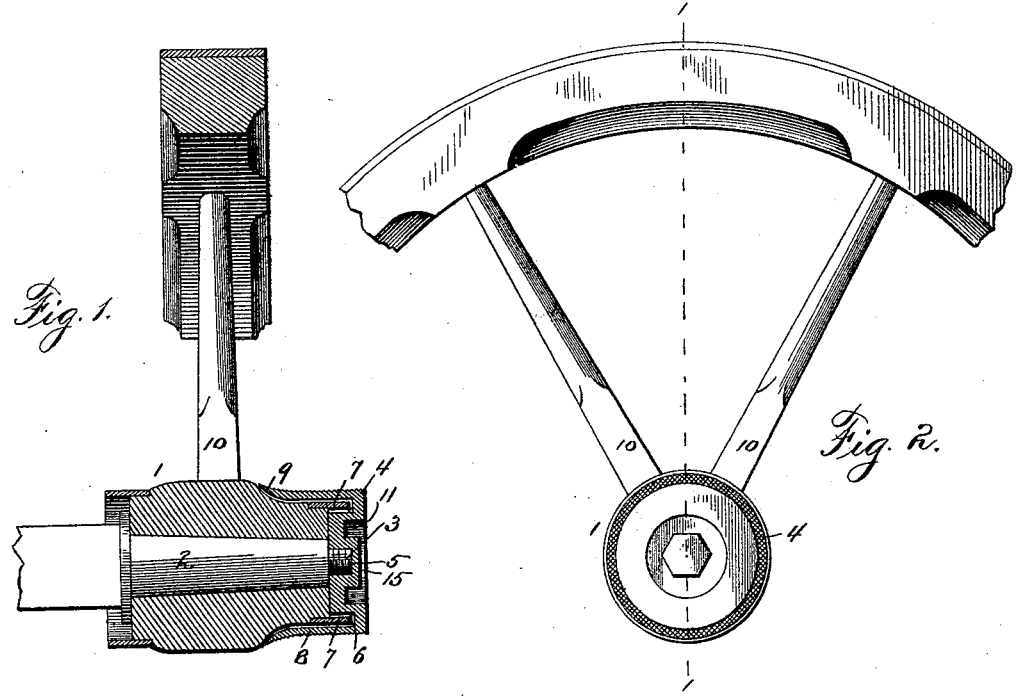
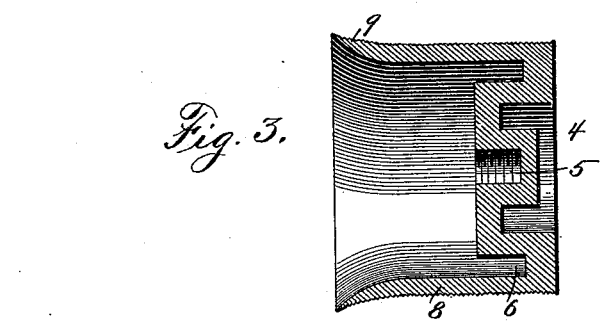
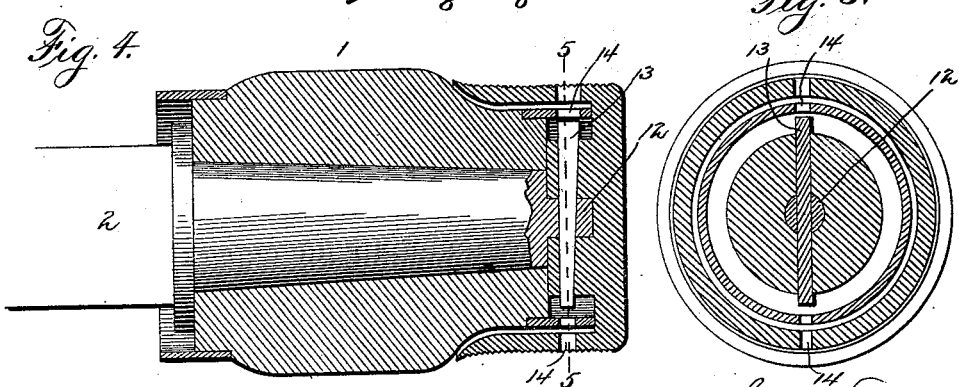
Witnesses:
John Enders Jr.
W. J. Tansley
Inventor:
Henry W. Broesquin
by
Higdon & Higdon Longau
Attys.

UNITED STATES PATENT OFFICE.

HENRY W. BROESQUIN, OF ST. LOUIS, MISSOURI.

VEHICLE-HUB.

SPECIFICATION forming part of Letters Patent No. 516,471, dated March 13, 1894.

Application filed August 21, 1893. Serial No. 483,673. (No model.)

*To all whom it may concern:*

Be it known that I, HENRY W. BROESQUIN, of St. Louis, State of Missouri, have invented certain new and useful Improvements in Vehicle-Hubs, of which the following is a full, clear, and exact description, reference being had to the accompanying drawings, forming a part hereof.

My invention relates to an improved combined vehicle step and axle nut, and consists in the novel arrangement and combination of parts, as will be more fully hereinafter described and designated in the claim.

In the drawings, Figure 1 is a longitudinal section of a vehicle hub, showing my invention applied to the same with parts broken away. Fig. 2 is an end view of my invention as applied to the vehicle axle. Fig. 3 is a longitudinal section of a combined vehicle step and axle nut detached. Fig. 4 is a longitudinal section of a vehicle hub, and also a section of the modified form of my invention. Fig. 5 is a cross section taken on the line 5, 5 of Fig. 4.

I will give a description of the advantages and general utility of my invention in connection with the mechanical description thereof.

Referring to the drawings, 1 indicates a vehicle hub which is virtually of the ordinary construction, the departure from the ordinary construction whereof will be more fully hereinafter described.

2 indicates the axle which is provided on its outer end with an externally screw threaded portion 3, on which my combined vehicle step and axle nut is adapted to be supported.

4 indicates my improved vehicle step and axle nut, the same being circular in cross section and bell shape in longitudinal section. Said vehicle step and axle nut has a closed outer end which is provided with an internally screw threaded socket 5, in which the externally screw threaded portion 3 of the axle 2 is adapted to be inserted, and is also provided with an annular depression 6 surrounding said socket so as to afford space for the location of the hub band 7. It may be noted in this connection that 8 indicates the shell or rim, which has a continuous roughened exterior surface, extending in the form of a circle completely around said shell, and is provided with the tapering inner edge 9. Said shell or rim 8 projects inwardly toward the spokes 10, but does not come in contact therewith as can be readily perceived by referring to Fig. 1. It may be noted in this connection that the vehicle step and axle nut is not turned by the rotation of the wagon hub, so that a person is perfectly safe in placing their foot on the roughened exterior surface thereof even while the vehicle is in motion. The said vehicle step and axle nut is also provided with a curvilinear depression 11 so as to lessen the weight of the same, and also with an angular projecting portion 15 for the reception of a wrench for applying and taking off the said vehicle step and nut from the axle.

In Fig. 4 I have shown a modification of my invention wherein instead of screwing the said vehicle step and axle nut on the axle, I secure the same to the reduced portion 12 of the axle 2, by means of a wedge or key 13 which is adapted to pass through suitable perforations 14 formed in the shell 8 and hub band 7, and also through a suitable perforation formed in the reduced portion of the axle 2.

Aside from the manner of securing the step and axle nut to the axle, the remaining construction is virtually the same, as can be seen in Figs. 1 and 4.

From the above description it will be observed that although my improved combined step and axle nut is likely to be locked in different positions axially with relation to the axle upon which it is mounted, yet by reason of its having a continuous roughened exterior surface extending in the form of a circle completely around it, an effective step-surface will be provided at all times, no matter what may be the axial position of said device upon said axle.

I am aware that prior to my invention combined steps and axle nuts have been provided with a step portion, having a roughened upper surface and formed integral so that said surface might be revolved and located in different axial positions with relation to the axle in tightening the nut upon said axle, and I, therefore, do not claim such as my invention.

Having fully described my invention, what I claim is—

The improved vehicle step and axle nut combined, comprising the body 4 circular in cross-section, having a continuous roughened exterior step-surface extending in the form of a circle completely around it, a closed outer end in which is formed a socket for receiving the outer end of the axle, an annular depression 6 surrounding said socket, a tapering inner edge 9, and means for securing said body upon the axle, whereby an effective stepping surface will be presented at all times in tightening the nut upon the axle, substantially as herein specified.

In testimony whereof I affix my signature in presence of two witnesses.

HENRY W. BROESQUIN.

Witnesses:
EDWARD E. LONGAN,
ALBERT LENZ.